(12) United States Patent
Dolezych et al.

(10) Patent No.: US 6,237,413 B1
(45) Date of Patent: May 29, 2001

(54) APPARATUS FOR MEASURING BELT TENSION

(75) Inventors: Susanne Dolezych, Im Grund 26, D-58313 Herdecke (DE); Uwe Schöbel, Dortmund (DE)

(73) Assignee: Susanne Dolezych, Herdecke (DE)

( * ) Notice: Subject to any disclaimer, the term of this patent is extended or adjusted under 35 U.S.C. 154(b) by 0 days.

(21) Appl. No.: 09/185,850

(22) Filed: Nov. 4, 1998

(51) Int. Cl.⁷ .................................................. A63B 21/02
(52) U.S. Cl. ........................................................ 73/379.03
(58) Field of Search ...................... 73/862.391, 862.453, 73/862.454, 862.451, 862.472, 862.581, 862.584, 862.47, 379.03, 862.48; 410/100, 103, 96

(56) References Cited

U.S. PATENT DOCUMENTS

| 4,437,352 | * | 3/1984 | Deborde et al. | ................... 73/862.47 |
| 5,542,798 | * | 8/1996 | Rawdon et al. | ..................... 410/100 |

* cited by examiner

*Primary Examiner*—William Oen
*Assistant Examiner*—Abdullahi Aw-Musse
(74) *Attorney, Agent, or Firm*—Herbert Dubno; Andrew Wilford

(57) ABSTRACT

An apparatus for measuring tension in a longitudinally extending belt has a longitudinally extending housing formed with a transversely extending guide passage, a pair of longitudinally spaced abutments fixed on the housing and longitudinally flanking the passage, and a piston displaceable in the guide passage and having an end forming a support movable crosswise across a longitudinally extending line defined by the fixed supports. An abutment is displaceable crosswise in the passage between a pair of end positions. A spring in the passage is braced between the abutment and the piston. An actuating member mounted on the housing is connected to the abutment for displacing same crosswise between its end positions and thereby compressing the spring against the piston. An indicator and scale mounted on the piston and housing show the relative positions of the piston and housing so that when a tensioned belt is engaged between the fixed supports and movable support the scale and indicator show how much the spring is compressed and therefore how much tension is in the belt.

10 Claims, 5 Drawing Sheets

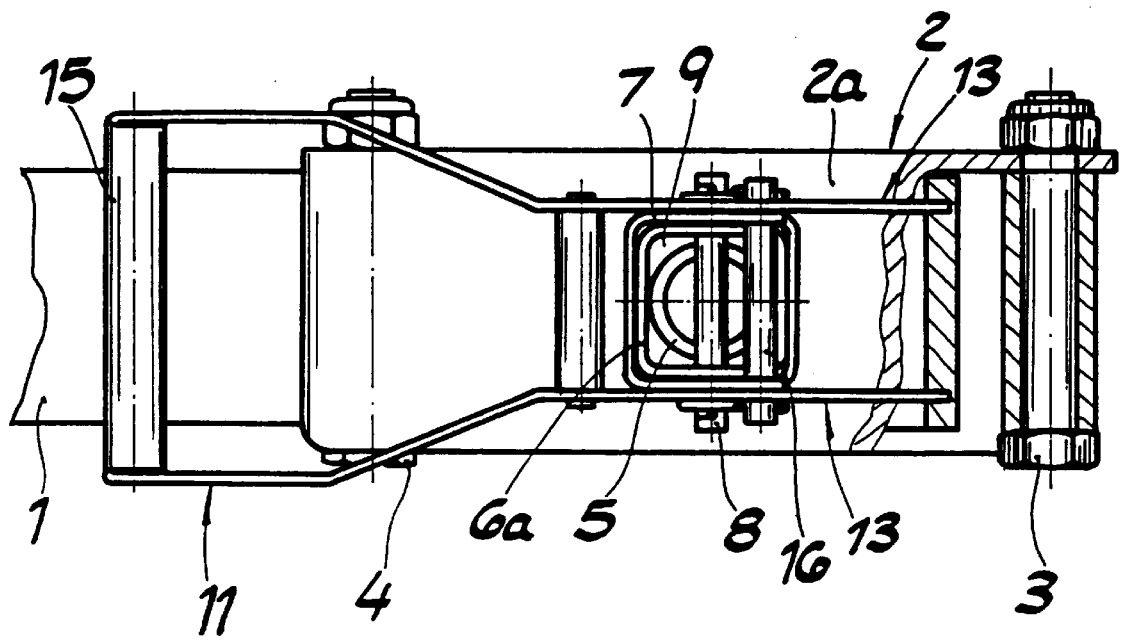
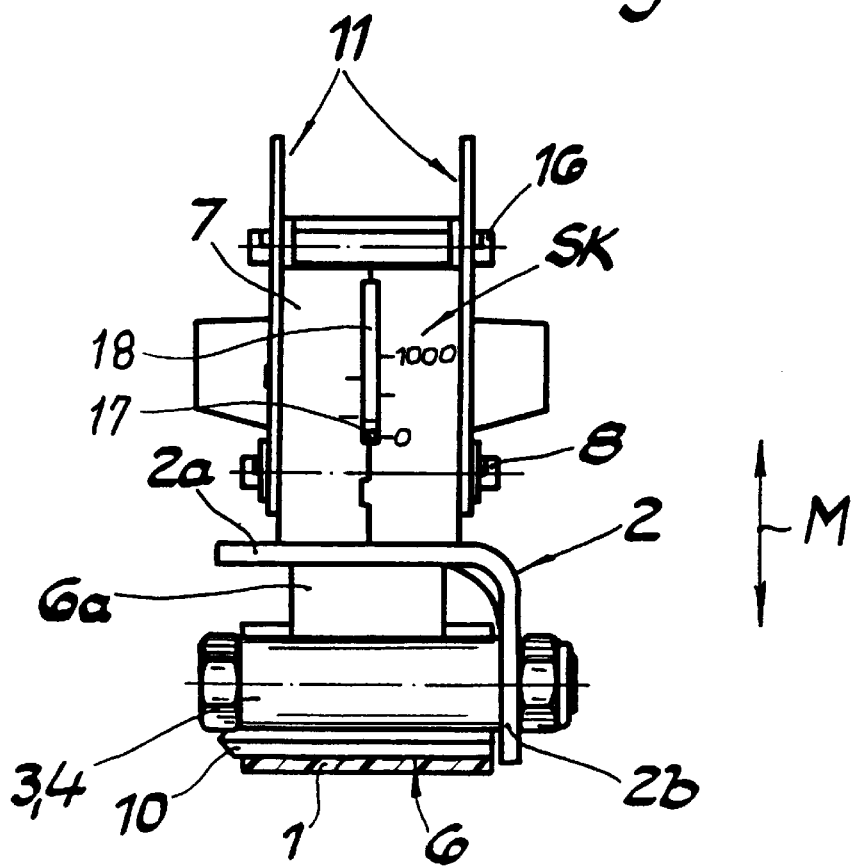

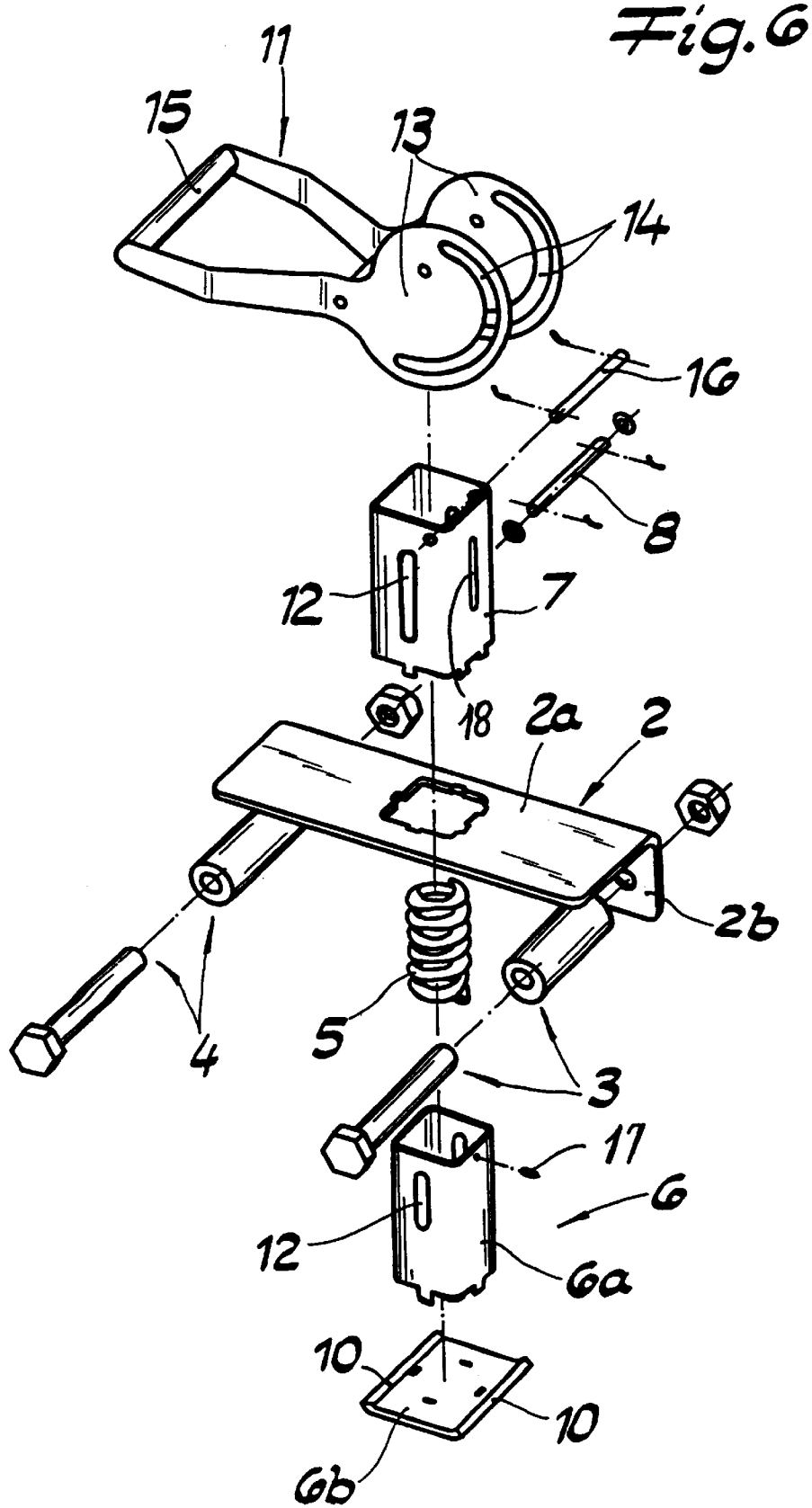

APPARATUS FOR MEASURING BELT TENSION

FIELD OF THE INVENTION

The present invention relates to an apparatus for measuring belt tension. More particularly this invention concerns a hand-held device for determining tension in a cargo or tie-down belt.

BACKGROUND OF THE INVENTION

In order to check tension in a belt, for instance a cargo belt, it is known from German patent 4,100,245 for the apparatus to have a housing carrying a pair of longitudinally spaced abutments fixed on the housing. A transversely movable support is braced against a spring and the extent of compression of the spring can be read so that when a tensioned belt is engaged between the fixed supports and movable support the scale and indicator show how much the spring is compressed and therefore how much tension is in the belt.

This device has a U-shaped housing traversed by bolts forming the fixed supports. The spring-loaded support is guided on the housing sides and a ratchet or the like is coupled via a guide bolt to this spring-loaded support. Such a device can be incorporated right in a standard tensioning device.

While this system is relatively effective, it is not simple in construction or very easy to use. Fitting it to a belt to measure the belt's tension can be tricky.

OBJECTS OF THE INVENTION

It is therefore an object of the present invention to provide an improved apparatus for measuring longitudinal tension in a belt.

Another object is the provision of such an improved apparatus for measuring longitudinal tension in a belt which overcomes the above-given disadvantages, that is which is relatively simple and inexpensive to manufacture and very easy to use.

SUMMARY OF THE INVENTION

An apparatus for measuring tension in a longitudinally extending belt has according to the invention a longitudinally extending housing formed with a transversely extending guide passage, a pair of longitudinally spaced abutments fixed on the housing and longitudinally flanking the passage, and a piston displaceable in the guide passage and having an end forming a support movable crosswise across a longitudinally extending line defined by the fixed supports. An abutment is displaceable crosswise in the passage between a pair of end positions. A spring in the passage is braced between the abutment and the piston. An actuating member mounted on the housing is connected to the abutment for displacing same crosswise between its end positions and thereby compressing the spring against the piston. An indicator and scale mounted on the piston and housing show the relative positions of the piston and housing so that when a tensioned belt is engaged between the fixed supports and movable support the scale and indicator show how much the spring is compressed and therefore how much tension is in the belt.

Such an apparatus is extremely easy to operate and simple to manufacture. It can easily be fitted to a belt to measure its tension. A single such device can readily be used to test all the belts securing a load. There is no need for the extra expense of building one such tension measurer into each ratchet tightener.

The housing according to the invention is provided with an upstanding rectangular-section collar forming the passage. In addition it is of L-section and has one leg provided with the passage-forming collar and another leg on which the fixed supports are mounted. The piston is a rectangular-section sleeve slidable in the collar and having a base plate forming the movable support and against which the spring is braced. This base plate has longitudinally spaced upturned ends.

The spring is a compression spring received in the sleeve and according to the invention the abutment is a pin extending transversely through the collar and sleeve. Thus this spring is well protected and unlikely to be damaged or come loose, as in the prior-art systems. The collar and sleeve are formed with aligned and transversely extending slots along which the abutment pin is slidable. In accordance with the invention the actuating member is pivotal on the housing and is formed with a cam engageable with the pin. More specifically the actuating member is a U-shaped lever pivoted on the housing and having a pair of cheeks engaging the pin. These cheeks are each formed with a spiral groove in which a respective end of the pin is engaged. The spiral can be constructed such that the lever is stable in both of its end positions. Thus the device is operated by simply swinging the lever from the rest to the use position and then looking at the scale to determine belt tension. A remote reader coupled to an electrical or electronic travel detector is also possible.

Most of the parts of the device according to the invention, in particular the housing and piston, are formed of sheet metal. Such parts can be stamped to the desired shape so that the device can be produced at relatively low cost.

BRIEF DESCRIPTION OF THE DRAWING

The above and other objects, features, and advantages will become more readily apparent from the following description, reference being made to the accompanying drawing in which:

FIGS. 4 and 5 are top and end views of the apparatus taken in the direction of respective arrows IV and V of FIG. 3; and FIG. 6 is an exploded view of the apparatus.

SPECIFIC DESCRIPTION

Figure 1:
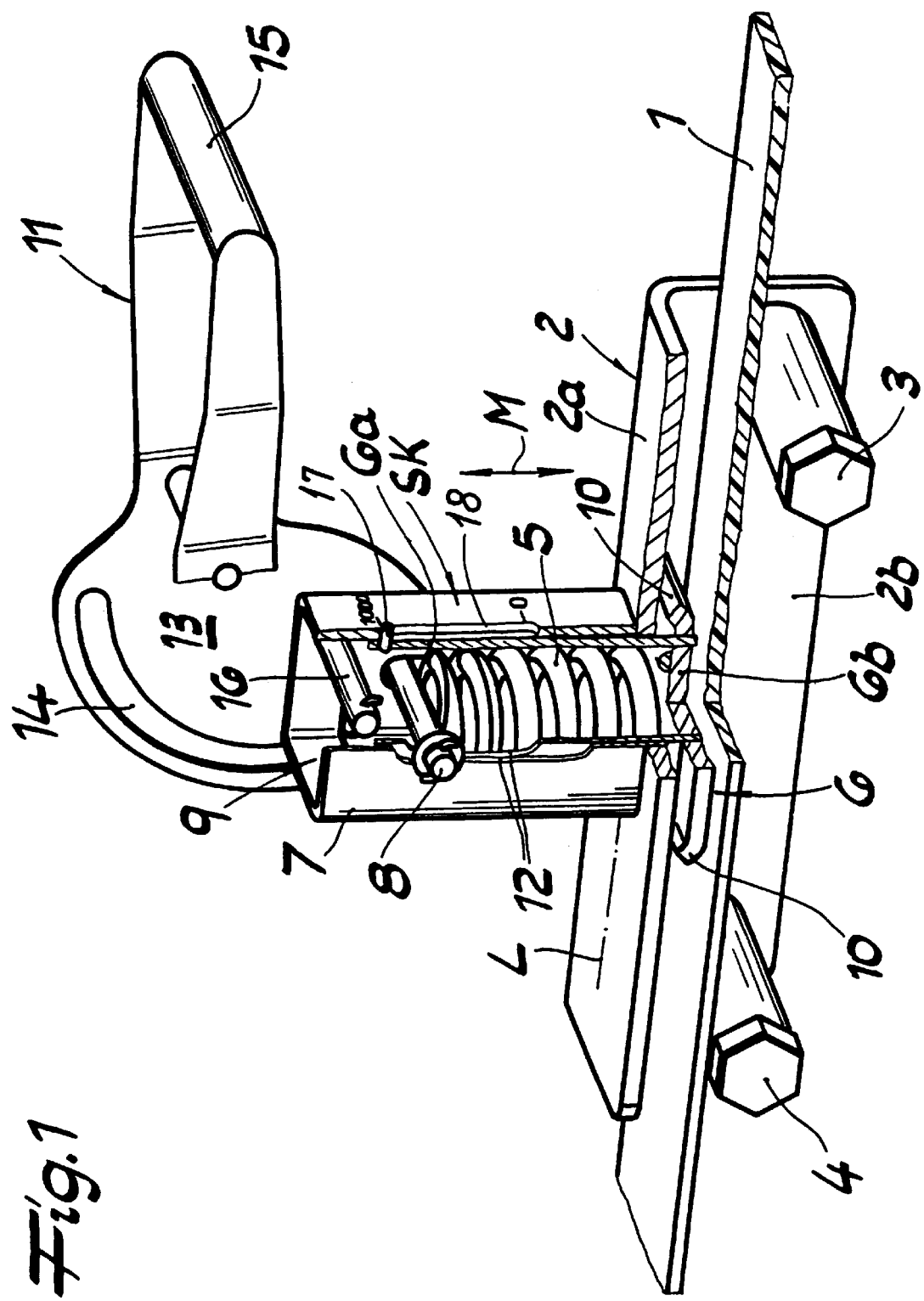
FIG. 1 is a partly broken-away perspective view of the apparatus according to the invention in the rest position.

As seen in FIG. 1 a belt 1 extending in a longitudinal direction L passes through an apparatus having a housing 2 provided with two fixed guide or support bolts 3 and 4 and a transversely movable guide or support piston 6. The housing 2 is L-shaped and formed of sheet metal with a leg 2a supporting a square-section guide collar 7 defining a passage 9 in which the piston 6 is slidable and a leg 2b to which the bolts forming the guides 3 and 4 are secured.

A spring 5 in the passage 9 is contained in a square-section sleeve 6a forming part of the support piston 6 and having at its lower end a crosswise base plate 6b with upturned ends 10 having a lower face that actually engages the belt 1 when in use as described below. To this end the spring 5 has a diameter 5 equal to slightly less than the crosswise width of the passage 9. This spring 5 is braced between an abutment pin 8 extending crosswise through aligned slots 12 in the sides of the sleeve 6a and collar 7 and an upper face of the bottom plate 6b of the support piston 6. A pin 17 seated in the sleeve 6a projects in the direction L through a vertical slot 17 in the collar 7 next to indicia forming a scale SK.

Figure 2:
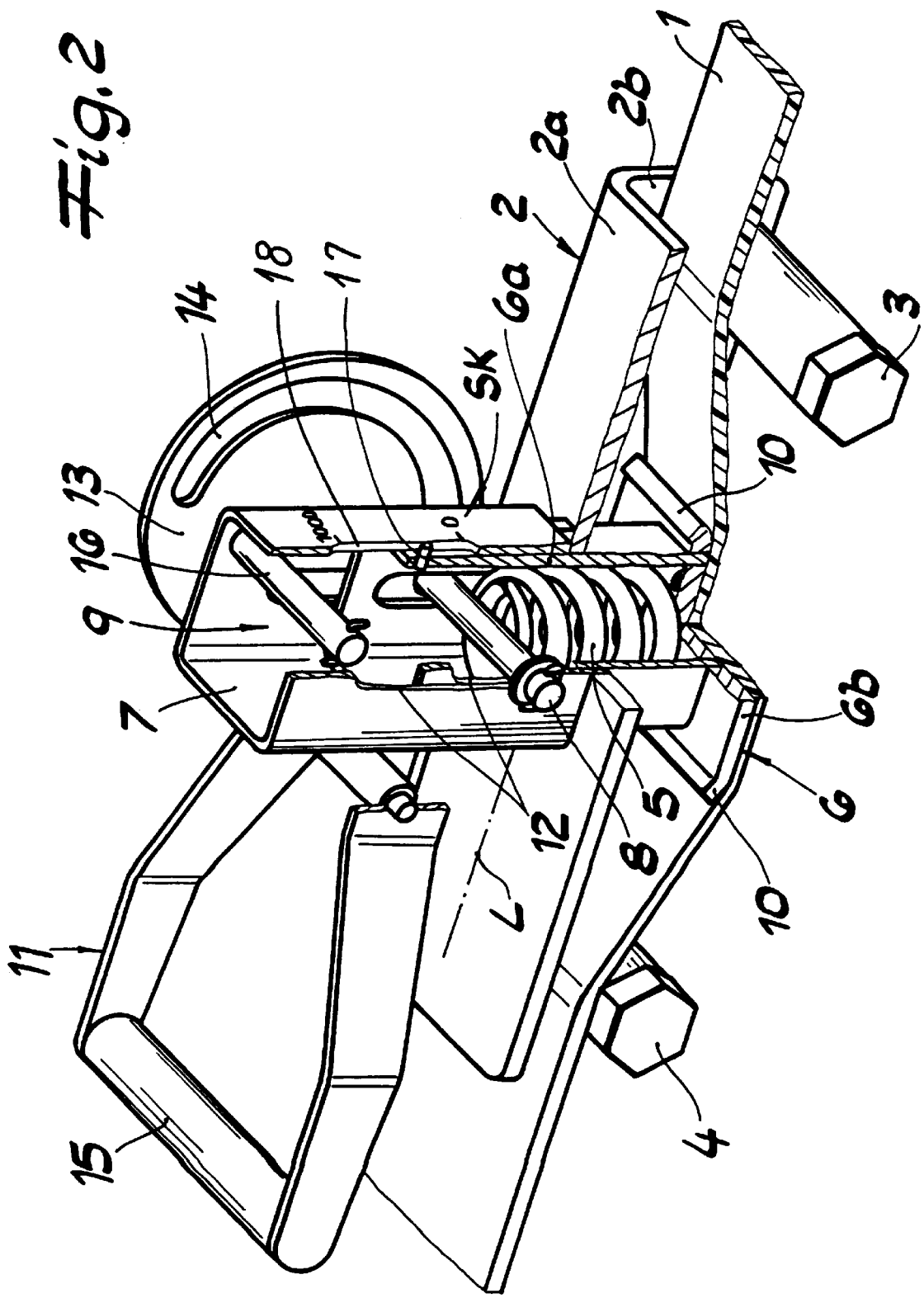
FIG. 2 is a view like FIG. 1 but in the measuring position.
Figure 3:
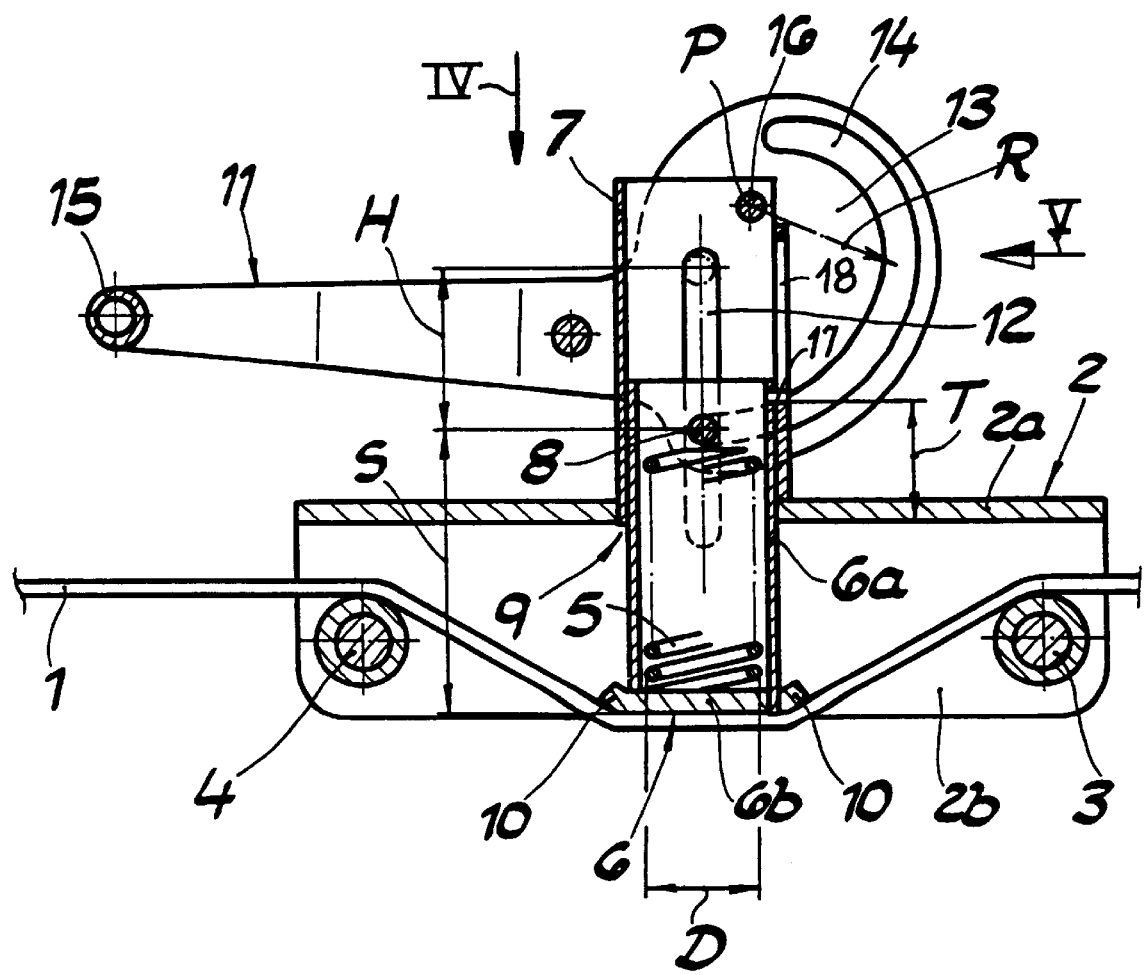
FIG. 3 is a vertical section through the apparatus in the measuring position.

The abutment pin 8 has outer ends that ride in spiral slots 14 of cheeks 13 of a handle 11 having a grip 15 and pivoted at a pin 16 adjacent upper ends of the slots 12. The slots 14 extend as spirals with a varying radius R (FIG. 3) from a center point P defined by the pin 16. Thus as the handle 11 is moved from the rest position of FIG. 1 to the actuated or measuring position of FIGS. 2 and 3, the abutment pin 8 is moved down in the slots 12 through a stroke H (FIG. 3), pressing the spring 5 against the support piston 6.

This device operates as follows:

To start with the handle 11 is naturally in the position of FIG. 1 in which the abutment pin 8 is in the top of the slots 12 and the supports 3 and 4 on one side and 6 on the other form a longitudinally throughgoing gap or passage. The pin 17 is at the top of the scale SK. A belt 1 can thus be fitted between the supports 3 and 4 on one side and the sole plate 6b on the other.

The handle 11 is then pivoted through 180° to displace the pin 8 downward in a direction M through the stroke H. Presuming there is no resistance to downward travel of the plate 6b, the spacing S between it and the pin 8 will remain the same. and the pin 17 will move to the bottom of the scale SK.

If, as is standard, the belt 1 is under some tension, the spring 5 will be compressed and the pin 17 will stop at a spacing from the bottom of the slot 18 that will be proportional to the extent of compression of the spring 5. Thus the scale SK will indicate how much tension is in the belt 1.

We claim:

1. An apparatus for measuring tension in a longitudinally extending belt, the apparatus comprising:

a longitudinally extending housing;

an upstanding collar fixed on the housing and forming a transversely extending guide passage;

a pair of longitudinally spaced abutments fixed on the housing and longitudinally flanking the passage;

a piston having a sleeve slidable in the guide passage and having a base plate forming a support movable crosswise across a longitudinally extending line defined by the fixed abutments, the collar and sleeve being formed with aligned transversely elongated slots;

an abutment pin displaceable in the slots between a pair of end positions;

a spring in the sleeve braced between the abutment pin and the base plate;

means including an actuating member mounted on the housing and connected to the abutment pin for displacing the abutment pin crosswise between the end pair of positions and thereby compressing the spring against the base plate; and an indicator and scale mounted on the sleeve and collar showing a position of the piston relative to the housing, whereby when a tensioned belt is engaged between the fixed abutments and movable support the scale and indicator show how much the spring is compressed and therefore how much tension is in the belt.

2. The belt-tension measuring apparatus defined in claim 1 wherein the collar and sleeve are of rectangular section.

3. The belt-tension measuring apparatus defined in claim 2 wherein the housing is of L-section and has one leg provided with the passage-forming collar and another leg on which the fixed abutments are mounted.

4. The belt-tension measuring apparatus defined in claim 1 wherein the base plate has longitudinally spaced upturned ends.

5. The belt-tension measuring apparatus defined in claim 4 wherein the spring is a compression spring.

6. The belt-tension measuring apparatus defined in claim 4 wherein the abutment pin extends transversely through the collar and sleeve.

7. The belt-tension measuring apparatus defined in claim 6 wherein the actuating member is pivotal on the housing and is formed with a cam engageable with the pin.

8. The belt-tension measuring apparatus defined in claim 7 wherein the actuating member is a U-shaped lever pivoted on the housing and having a pair of cheeks engaging the pin.

9. The belt-tension measuring apparatus defined in claim 8 wherein the cheeks are each formed with a spiral groove in which a respective end of the pin is engaged.

10. The belt-tension measuring apparatus defined in claim 1 wherein the housing and piston are formed of sheet metal.

* * * * *